United States Patent [19]

Nosaka et al.

[11] Patent Number: 5,374,679
[45] Date of Patent: Dec. 20, 1994

[54] SIZING AGENT AND PAPER SIZED THEREWITH

[75] Inventors: Yoshihumi Nosaka; Osamu Ishiguro, both of Niigata, Japan

[73] Assignees: Denki Kagaku Kogyo Kabushiki Kaisha; Nippon Paper Industries Co., Ltd., both of Tokyo, Japan

[21] Appl. No.: 220,631

[22] Filed: Mar. 31, 1994

[51] Int. Cl.⁵ .................... C08L 29/02; C08L 71/02
[52] U.S. Cl. ........................... 525/56; 525/57; 525/58; 525/208; 524/378; 524/503
[58] Field of Search ............. 525/58, 208, 57, 56; 524/378, 503

[56] References Cited

U.S. PATENT DOCUMENTS

| | | | |
|---|---|---|---|
| 3,634,295 | 1/1972 | Dunlap et al. | 260/29.6 WB |
| 3,666,400 | 5/1972 | Lofton et al. | 8/115.6 |
| 3,817,898 | 6/1974 | Ward | 260/29.6 NR |
| 4,206,101 | 6/1980 | Wysong | 260/23 R |
| 4,379,095 | 4/1983 | Oldack | 260/815 |
| 4,388,442 | 6/1983 | Taniguchi et al. | 525/60 |
| 4,389,506 | 6/1983 | Hassall, Jr. | 524/377 |
| 4,640,946 | 2/1987 | Vassallo et al. | 524/45 |
| 4,735,986 | 4/1988 | Iacoviello | 524/427 |
| 4,824,904 | 4/1989 | Aoyama et al. | 525/60 |
| 5,110,859 | 5/1992 | Flesher et al. | 524/503 |
| 5,248,724 | 9/1993 | Nosaka et al. | 525/58 |

FOREIGN PATENT DOCUMENTS 5-295693  11/1993  Japan.

*Primary Examiner*—James J. Seidleck
*Assistant Examiner*—W. Robinson H. Clark
*Attorney, Agent, or Firm*—Oblon, Spivak, McClelland, Maier & Neustadt

[57] ABSTRACT

A sizing agent for paper, which comprises 100 parts by weight of a polyvinyl alcohol (component A) and from 1 to 20 parts by weight of a compound (component B) provided with the following requisites (1) to (4):

(1) the backbone chain is a random copolymer of ethylene oxide and propylene oxide, (2) in the backbone chain, the proportion of oxyethylene units is from 20 to 40% by weight, and the proportion of oxypropylene units is from 60 to 80% by weight, (3) of the two terminals, one terminal is a hydroxyl group, and the other terminal is a $C_{1-10}$ alkoxyl group or a hydroxyl group, and (4) the weight average molecular weight is from 600 to 1,200.

10 Claims, No Drawings

SIZING AGENT AND PAPER SIZED THEREWITH

BACKGROUND OF THE INVENTION

1. Field of the Invention

The present invention relates to a sizing agent for paper, which is useful for sizing paper or paper board (hereinafter paper and paper board will be generally referred to simply as "paper") and paper sized with such a sizing agent.

2. Discussion of Background

Heretofore, various sizing agents have been used To improve various strength and printability of paper or the appearance of printed matters. Among such sizing agents, those using a polyvinyl alcohol, a starch or both of them, are typical.

However, paper sized with a starch has a drawback such that when it is subjected to printing, paper powder is likely to form, and such paper powder tends to deteriorate the appearance of the printed matter, or such paper powder is likely to accumulate between printing rollers, thus leading to a trouble of e.g. rupture of the paper. Further, paper sized with a starch tends to have inadequate strength, whereby defects such as picking and blistering are likely to occur at the printed surface, and such tendency is particularly remarkable when the printing speed is high. On the other hand, paper sized with a polyvinyl alcohol has a drawback such that it shows tackiness in a state wet with water, although it exhibits excellent properties with no substantial formation of paper powder or with no substantial deterioration of the appearance due to damage of the printed surface given by high speed printing. This drawback causes, for example, a printing trouble such that when the paper sized with a polyvinyl alcohol is subjected to offset printing, if the paper is wetted upon contact with damping water, tackiness will be created, whereby a trouble such as adhesion of the paper to itself or adhesion of the paper to the printing rollers, is likely to result. If such a trouble occurs during printing, the printing operation will have to be stopped, thus leading to a substantial loss in the productivity and a loss of materials, and further the machine is likely to be damaged.

Japanese Unexamined Patent Publication No. 41611/1974 discloses a sizing agent having a non-ionic surfactant incorporated to a polyvinyl alcohol and having a third component such as urea, a urea derivative, thiourea, a thiourea derivative or a guanidine derivative incorporated. However, this sizing agent requires a third component such as urea, as an essential component. Besides, the effect for reducing the tackiness of the sized paper in a wet state, is still inadequate.

Further, Japanese Unexamined Patent Publication No. 295693/1993 discloses a surface sizing agent for paper comprising a polyvinyl alcohol resin and polyethylene glycol as essential components. However, this sizing agent has a problem with respect to printability.

Reflecting a trend in recent years for multi-color printing or weight reduction of medium or low quality paper such as paper for newspapers, which is subjected to high speed printing in a large quantity, it has become common to size such medium or low quality paper, and it has become common to employ an offset printing system as a printing system for such sized paper. Therefore, it has been desired to develop a sizing agent for paper which presents low tackiness even when the sized paper is in a wet state and which is excellent in printability.

SUMMARY OF THE INVENTION

It is an object of the present invention to solve the above problems.

The present invention provides a sizing agent for paper, which comprises 100 parts by weight of a polyvinyl alcohol (component A) and from 1 to 20 parts by weight of a compound (component B) provided with the following requisites (1) to (4):

(1) the backbone chain is a random copolymer of ethylene oxide and propylene oxide, (2) in the backbone chain, the proportion of oxyethylene units is from 20 to 40% by weight, and the proportion of oxypropylene units is from 60 to 80% by weight, (3) of the two terminals, one terminal is a hydroxyl group, and the other terminal is a $C_{1-10}$ alkoxyl group or a hydroxyl group, and (4) the weight average molecular weight is from 600 to 1,200.

The present invention also provides paper sized with such a sizing agent.

DETAILED DESCRIPTION OF THE PREFERRED EMBODIMENTS

There is no particular restriction as to component A i.e. the polyvinyl alcohol (hereinafter referred to simply as PVA) to be used for the sizing agent of the present invention. It may be a PVA obtained by completely or partially hydrolyzing a polymer or copolymer obtained by polymerizing one or more fatty acid vinyl esters, or a copolymer of one or more fatty acid vinyl esters with one or more other monomers copolymerizable therewith, or a PVA obtained by post-modifying such a PVA.

Among the above PVAs, preferred is a PVA obtained by hydrolyzing a polymer or copolymer of a fatty acid vinyl ester. Particularly preferred is a PVA obtained by completely or partially hydrolyzing a polymer of vinyl acetate. The fatty acid vinyl ester is preferably vinyl acetate, but may be others such as vinyl propionate and vinyl formate.

Said other monomers copolymerizable with fatty acid vingyl esters, include, for example, olefins such as ethylene and propylene; polymerizable monocarboxylic acids such as acrylic acid, methacrylic acid, crotonic acid and isocrotonic acid; polymerizable dicarboxylic acids such as maleic acid, fumaric acid and itaconic acid; polymerizable dicarboxylic anhydrides such as maleic anhydride; esters and salts of polymerizable monocarboxylic acids and polymerizable dicarboxylic acids; polymerizable acid amides such as acrylamide and methacrylamide; acrylates such as methyl acrylate, ethyl acrylate and butyl acrylate; methacrylates such as methyl methacrylate, ethyl methacrylate and butyl methacrylate; vinyl halides such as vinyl chloride and vinyl fluoride; vinylidene halides such as vinylidene chloride and vinylidene fluoride; monomers having glycidyl groups, such as allylglycidyl ether and glycidyl methacrylate; and alkylvinyl ethers.

The average degree of polymerization of PVA is preferably from 500 to 4,000, more preferably from 1,000 to 3,000, with a view to increasing the strength of paper. Further, PVA is preferably water-soluble, and its degree of hydrolysis is usually at least 90 mol %, preferably at least 95 mol %, more preferably at least 97.5 mol % with a view to low moisture sensitivity and high strength of paper. In the present invention, a plurality of PVA differring in the degree of polymerization, the degree of hydrolysis or the units constituting PVA, may be used in combination.

Component B to be used in the present invention is a compound wherein the backbone chain is a random copolymer of ethylene oxide and propylene oxide, which comprises from 20 to 40% by weight of oxyethylene units and from 60 to 80% by weight of oxypropylene units, and one of the two terminals is a hydroxyl group and the other is a $C_{1-10}$ alkoxyl group or a hydroxyl group, and which has a weight average molecular weight of from 600 to 1,200.

If the proportions of the oxyethylene units and the oxypropylene units in the backbone chain are outside the above ranges, if the carbon number of the alkoxyl group is 11 or more, or if the weight average molecular weight is outside the range of from 600 to 1,200, the effect for reducing the tackiness of the sized paper in a wet state, tends to be inadequate. Further, if the backbone chain of component B is a block copolymer of ethylene oxide and propylene oxide, the effect for reducing the tackiness of the sized paper in a wet state, is small as compared with the case where the backbone chain is a random copolymer.

Component B includes, for example, compounds satisfying the above requirements (1) to (4), as identified in the following items (i) and (ii). Among them, a compound of type (X) as identified in the following item (i) is preferred.

(i) A compound wherein the backbone chain is a random copolymer comprising oxypropylene units and oxyethylene units, and one of the two terminals is an alkoxyl group and the other is a hydroxyl group, obtained by conventional addition-polymerization in the presence of a $C_{1-10}$ alcohol, propylene oxide and ethylene oxide (hereinafter referred to as a compound of type (X)).

(ii) A compound which is a random copolymer comprising oxypropylene units and oxyethylene units, wherein both terminals are hydroxyl groups, obtained by conventional addition-polymerization in the presence of diethylene glycol and/or dipropylene glycol, propylene oxide and ethylene oxide (hereinafter referred to as a compound of type (Y)).

In the present invention, such compounds may be used alone or in combination as a mixture of two or more of them, as component B. The amount of component B to be used is from 1 to 20 parts by weight, preferably from 2 to 10 parts by weight, per 100 parts by weight of PVA. If the amount of component B is less than 1 part by weight, the effect for reducing tackiness of the sized paper in a wet state to itself or to printing rollers, tends to be low. On the other hand, if it exceeds 20 parts by weight, it impairs the effect of PVA as a sizing agent.

There is no particular restriction as to the form of the sizing agent of the present invention. For example, it may be a mixture of component B and powdery PVA, a mixture of component B and an aqueous PVA solution, or the one having an additional component incorporated thereto, as the case requires. At the time of mixing, component B may be used alone or as previously dissolved or dispersed in an organic solvent or water.

The sizing agent of the present invention may contain or may be used in combination with other components, as the case requires, to such an extent not to impair the effects of the present invention. As such other components, starches such as corn starch and oxidized starch, water-soluble cellulose compounds such as carboxymethyl cellulose (CMC), methyl cellulose and hydroxyalkyl cellulose, synthetic rubber latexes such as a styrene-butadiene copolymer latex and a styrene-butadiene-methacrylate copolymer latex, a water-resisting agent for PVA, inorganic pigments such as titanium oxide, clay and calcium carbonate, synthetic resin pigments such as fine powdery thermosetting resins (such as a urea resin or a melamine resin) and fine powdery thermoplastic resins (such as a vinylidene chloride resin, a vinyl chloride resin or a styrene-butadiene copolymer resin) and a defoaming agent, may, for example, be mentioned.

In a case where the sizing agent of the present invention is used in combination with a pigment, the concentration of a non-volatile content in the sizing solution is usually limited to a level of from 1 to 20% by weight, and the amount of pigment is usually less than 400 parts by weight per 100 parts by weight of PVA contained in the solution in order to avoid a substantial increase in the weight of paper by sizing.

The sizing agent of the present invention may be coated on paper or impregnated in paper in the form of an aqueous solution or an aqueous dispersion. To obtain an aqueous solution or aqueous dispersion of the sizing agent, a mixture of PVA (component A) and component B, may, for example, be dissolved or dispersed in water, or an aqueous solution or dispersion of PVA and an aqueous solution or dispersion of component B may be mixed. Otherwise, one of PVA and component B is dissolved or dispersed in water, and the other component is then mixed thereto. To incorporate other components or a sizing agent other than PVA, such material may be mixed to the sizing agent of the present invention in a liquid or solid form by a method suitable for such material.

The sized paper of the present invention can be obtained by using, as a sizing solution, an aqueous solution or aqueous dispersion containing the sizing agent of the present invention and by coating or impregnating this solution on one side or both sides of paper by means of a conventional apparatus such as a gate roll coater, a size press or a bar coater, followed by drying the paper.

The amount of the sizing agent of the present invention contained in the above sizing solution, is optionally selected depending upon the desired coated amount (an increase in the dry weight of paper caused by coating), the apparatus to be used for coating or the conditions for the coating operation. It is usually at a level of from 0.5 to 8 parts by weight per 100 parts by weight of the total amount of the sizing agent and water in the sizing solution.

The coated amount of the sizing agent of the present invention on the paper to be sized, may optionally be selected depending upon e.g. the desired properties of sized paper. It is usually at a level of from 0.05 to 0.5 $g/m^2$ per one side of paper.

The paper sized with the sizing agent of the present invention has excellent properties such that the tackiness in a wet state is low, smooth printing can be conducted even by high speed offset printing, and printed matters with excellent finish can be obtained.

Now, the present invention will be described in further detail with reference to Examples and Comparative Examples. However, it should be understood that the present invention is by no means restricted to such specific Examples.

In the following Examples and Comparative Examples, the structure, composition, etc. of a compound wherein the backbone chain is a random copolymer of ethylene oxide and propylene oxide, were analyzed by NMR, etc. Further, the weight average molecular weight was calculated from a hydroxyl value which was obtained by esterifying hydroxyl groups of the compound with phthalic anhydride in pyridine, followed by titration with potassium hydroxide.

EXAMPLE 1

To a 1.4 wt % aqueous solution of PVA K-17 (manufactured by Denki Kagaku Kogyo K.K., average degree of polymerization: 1,700, degree of hydrolysis: 99.0 mol %), a compound of type (X) wherein the backbone chain is a random copolymer of ethylene oxide and propylene oxide, one of the terminals is a $C_8$ alkoxyl group and the other terminal is a hydroxyl group, and in the backbone chain, the proportion of oxyethylene units is 30% by weight and the proportion of oxypropylene units is 70% by weight, and which has a weight average molecular weight of 850, was added and mixed as component B in an amount of 5 parts by weight per 100 parts by weight of PVA in the aqueous solution, to obtain a sizing solution.

Using this sizing solution, coated paper was prepared in accordance with the method as described in the following item (1), and tests for evaluating this coated paper were conducted in accordance with the methods as described in the following item (2). The test results are shown in Table 3.

(1) Preparation of coated paper

The sizing solution was coated on one side of raw paper (basis weight: 46 g/m$^2$) for newspapers by a coating rod so that the coated amount of the sizing agent would be 0.4 g/m$^2$. The coated paper was dried in air, followed by one pass treatment by an iron press (70° C.). Then, it was adjusted at 20° C. for 24 hours under a relative humidity of 65% to obtain coated paper for evaluation tests.

(2) Tests For evaluating physical properties of the coated paper

Sticking Strength of Coated Paper/Coated Paper

A sheet of the coated paper having a width of 30 mm and a length of 100 mm was dipped in water at a temperature of 20° C. for 5 seconds. Then, it was folded to a length of 50 mm so that the coated surface was in contact, and non-coated paper was placed on each exterior side, followed by pressing under a pressure of 50 kg/cm$^2$ for 5 seconds to obtain a test specimen. Immediately after the pressing, this test specimen was subjected to T type peeling by pulling at a speed of 30 mm/min by means of a tensile tester (UTM-4-100), whereby the load required for peeling the sticked coated surface, was measured. This load value was taken as the sticking strength (g/30 mm) of coated paper/coated paper.

Sticking Strength of Rubber Sheet/Coated Paper

The coated paper having a width of 100 mm was dipped in water at 20° C. for 5 seconds. Then, this paper was placed on a rubber sheet (150×150 mm, manufactured by NBR) so that the coated surface contacted the rubber sheet, and on the non-coated side of the coated sheet, two sheets of non-coated paper were placed, followed by pressing under a pressure of 10 kg/cm$^2$ for 5 seconds to obtain a test specimen. Immediately after the pressing, this test specimen was subjected to T type peeling by pulling at a speed of 1,000 mm/min by a tensile tester, whereby the load required for peeling the coated surface from the rubber sheet, was measured. This load value was taken as the sticking strength (g/100 mm) of rubber sheet/coated paper.

RI Printability

Using a RI tester, printing was conducted in a wet state under a printing pressure of 8 mm using ink IPI#6, and the printed surface was visually evaluated in accordance with the following evaluation standards of four grades.

Evaluation Standard
 0: No change
 1: Slight blistering observed
 2: Slight picking observed, and blistering observed
 3: Rupture of paper observed

EXAMPLES 2 TO 18 AND COMPARATIVE EXAMPLES 2 TO 5 AND 11 TO 13

A sizing solution was prepared in the same manner as in Example 1 except that component A or B used was changed as identified in Table 1 or 2. Using this sizing solution, the tests were conducted in the same manner as in Example 1, and the results are shown in Table 3 or 4.

COMPARATIVE EXAMPLE 1

A 1.4 wt % aqueous solution of PVA K-17 was used as a sizing solution. Using this sizing solution, the tests were conducted in the same manner as in Example 1, and the results are shown in Table 4.

COMPARATIVE EXAMPLE 6

To a 1.4 wt % aqueous solution of PVA K-17, a compound wherein the backbone chain is a block copolymer of ethylene oxide and propylene oxide, one of the terminals is a $C_8$ alkoxy group and the other terminal is a hydroxyl group, and in the backbone chain, the proportion of oxyethylene units is 30% by weight and the proportion of oxypropylene units is 70% by weight, and which has a weight average molecular weight of 850, was added and mixed as component B in an amount of 5 parts by weight per 100 parts by weight of PVA in the aqueous solution, to obtain a sizing solution. Using this sizing solution, the preparation of coated paper and the tests were conducted in the same manner as in Example 1. The test results are shown in Table 4.

COMPARATIVE EXAMPLE 7

A 1.4 wt % aqueous solution of oxidized starch (MS-3800, manufactured by Nippon Shokuhin Kako K.K.) was used as a sizing solution. Using this sizing solution, the tests were conducted in the same manner as in Example 1, and the results are shown in Table 4.

COMPARATIVE EXAMPLE 8

To a 1.4 wt % aqueous solution of PVA K-17, a commercially available paraffin emulsion was incorporated in a weight ratio of PVA/paraffin emulsion (nonvolatile content)=3/1, to obtain a sizing solution. Using this sizing solution, the tests were conducted in the same manner as in Example 1, and the results are shown in Table 4.

COMPARATIVE EXAMPLE 9

To a 1.4 wt % aqueous solution of PVA K-17, polyoxyethylene nonylphenyl ether as a non-ionic surfactant and urea were incorporated in a weight ratio of PVA/- polyoxyethylene nonylphenyl ether/urea=100/5/10, to obtain a sizing solution. Using this sizing solution the tests were conducted in the same manner as in Example 1, and the tests results are shown in Table 4.

TABLE 1

| Example No. | Component A (PVA) | | Component B | | | | | |
|---|---|---|---|---|---|---|---|---|
| | Average degree of polymerization | Degree of hydrolysis (mol %) | Amount | Type of compound | Number of carbon atoms in the terminal alkoxyl group | Weight average molecular weight | Backbone chain (wt %) | |
| | | | | | | | Oxyethylene units | Oxypropylene units |
| 1 | 1,700 | 99 | 5 | (X) | 8 | 850 | 30 | 70 |
| 2 | 1,700 | 99 | 2 | (X) | 8 | 850 | 30 | 70 |
| 3 | 1,700 | 99 | 10 | (X) | 8 | 850 | 30 | 70 |
| 4 | 1,700 | 99 | 1 | (X) | 8 | 850 | 30 | 70 |
| 5 | 1,700 | 99 | 20 | (X) | 8 | 850 | 30 | 70 |
| 6 | 1,700 | 99 | 5 | (X) | 8 | 840 | 23 | 77 |
| 7 | 1,700 | 99 | 5 | (X) | 8 | 860 | 38 | 62 |
| 8 | 1,700 | 99 | 5 | (X) | 8 | 1070 | 30 | 70 |
| 9 | 1,700 | 99 | 5 | (X) | 8 | 630 | 30 | 70 |
| 10 | 1,700 | 98.5 | 5 | (X) | 8 | 850 | 30 | 70 |
| 11 | 1,700 | 97.5 | 5 | (X) | 8 | 850 | 30 | 70 |
| 12 | 1,000 | 99 | 5 | (X) | 8 | 850 | 30 | 70 |
| 13 | 2,400 | 99 | 5 | (X) | 8 | 850 | 30 | 70 |
| 14 | 1,700 | 99 | 5 | (X) | 1 | 750 | 30 | 70 |
| 15 | 1,700 | 99 | 5 | (X) | 10 | 880 | 30 | 70 |
| 16 | 1,700 | 99 | 5 | (Y) | OH | 860 | 30 | 70 |
| 17 | 1,700 | 99 | 20 | (Y) | OH | 860 | 30 | 70 |
| 18 | 1,700 | 96.5 | 5 | (X) | 8 | 850 | 30 | 70 |

Note 1)
"OH" in the column for "number of carbon atoms in the terminal alkoxyl group" indicates that both terminals of component B are hydroxyl groups.
Note 2)
The amount of component B is represented by parts by weight of component B per 100 parts by weight of component A (PVA).

TABLE 2

| Comparative Example No. | Component A (PVA) | | Component B | | | | | |
|---|---|---|---|---|---|---|---|---|
| | Average degree of polymerization | Degree of hydrolysis (mol %) | Amount | Type of compound | Number of carbon atoms in the terminal alkoxyl group | Weight average molecular weight | Backbone chain (wt %) | |
| | | | | | | | Oxyethylene units | Oxypropylene units |
| 1 | 1,700 | 99 | — | — | — | — | — | — |
| 2 | 1,700 | 99 | 0.5 | (X) | 8 | 850 | 30 | 70 |
| 3 | 1,700 | 99 | 25 | (X) | 8 | 850 | 30 | 70 |
| 4 | 1,700 | 99 | 5 | (X) | 8 | 830 | 18 | 82 |
| 5 | 1,700 | 99 | 5 | (X) | 8 | 860 | 42 | 58 |
| 6 | 1,700 | 99 | 5 | Block | 8 | 850 | 30 | 70 |
| 7 | — | — | 0 | — | — | — | — | — |
| 8 | 1,700 | 99 | 0 | — | — | — | — | — |
| 9 | 1,700 | 99 | 0 | — | — | — | — | — |
| 10 | — | — | 0 | — | — | — | — | — |
| 11 | 1,700 | 99 | 5 | (X) | 13 | 880 | 30 | 70 |
| 12 | 1,700 | 99 | 5 | (X) | 8 | 560 | 30 | 70 |
| 13 | 1,700 | 99 | 5 | (X) | 8 | 1570 | 30 | 70 |
| 14 | 1,700 | 99 | 20 | PEG | — | 6000 | — | — |

Note 1)
"Block" in the column for "Type of compound" means a block copolymer wherein the backbone chain of component B comprises block segments of oxyethylene units and oxypropylene units.
Note 2)
The amount of component B is represented by parts by weight of component B per 100 parts by weight of component A (PVA).

tests were conducted in the same manner as in Example 1, and the results are shown in Table 4.

COMPARATIVE EXAMPLE 10

With respect to the non-coated paper (raw paper for newspapers, basis weight: 46 g/m²), the tests for evaluating the physical properties were conducted in the same manner as in Example 1, and the results are shown in Table 4.

COMPARATIVE EXAMPLE 14

To a 1.4 wt % aqueous solution of PVA K-17, a commercially available polyethylene glycol (PEG 6000, manufactured by Daiichi Kogyo Seiyaku) was incorporated in a weight ratio of PVA/polyethylene glycol=100/20, to obtain a sizing solution. Using this sizing solution, the tests were conducted in the same

TABLE 3

| | Physical properties of coated paper | | |
|---|---|---|---|
| | Sticking strength of coated paper/coated paper (g/30 mm) | Sticking strength of rubber sheet/coated paper (g/100 mm) | RI picking |
| Example 1 | 1.8 | 0.6 | 0 |
| Example 2 | 2.2 | 0.8 | 0 |
| Example 3 | 2.1 | 0.7 | 0 |
| Example 4 | 2.6 | 1.0 | 0 |
| Example 5 | 2.5 | 0.9 | 1 |
| Example 6 | 2.4 | 0.9 | 0 |
| Example 7 | 2.5 | 1.0 | 0 |
| Example 8 | 2.5 | 0.9 | 0 |
| Example 9 | 2.4 | 0.8 | 0 |
| Example 10 | 2.0 | 0.7 | 0 |
| Example 11 | 2.3 | 0.9 | 1 |
| Example 12 | 2.0 | 0.7 | 1 |
| Example 13 | 2.1 | 0.8 | 0 |
| Example 14 | 2.2 | 0.8 | 0 |

TABLE 3-continued

| | Physical properties of coated paper | | |
|---|---|---|---|
| | Sticking strength of coated paper/coated paper (g/30 mm) | Sticking strength of rubber sheet/coated paper (g/100 mm) | RI picking |
| Example 15 | 2.3 | 0.8 | 0 |
| Example 16 | 2.4 | 0.8 | 0 |
| Example 17 | 2.8 | 1.0 | 1 |
| Example 18 | 2.6 | 1.0 | 1 |

TABLE 4

| | Physical properties of coated paper | | |
|---|---|---|---|
| | Sticking strength of coated paper/coated paper (g/30 mm) | Sticking strength of rubber sheet/coated paper (g/100 mm) | RI picking |
| Comparative Example 1 | 43.4 | 2.9 | 0 |
| Comparative Example 2 | 14.3 | 2.2 | 0 |
| Comparative Example 3 | 3.1 | 1.2 | 2 |
| Comparative Example 4 | 3.6 | 1.4 | 0 |
| Comparative Example 5 | 3.8 | 1.5 | 0 |
| Comparative Example 6 | 3.3 | 1.2 | 0 |
| Comparative Example 7 | 8.2 | 2.1 | 2 |
| Comparative Example 8 | 12.4 | 2.7 | 1 |
| Comparative Example 9 | 13.0 | 2.6 | 2 |
| Comparative Example 10 | 1.2 | 0.1 | 3 |
| Comparative Example 11 | 3.7 | 1.5 | 0 |
| Comparative Example 12 | 4.1 | 1.7 | 0 |
| Comparative Example 13 | 4.2 | 1.8 | 0 |
| Comparative Example 14 | 8.4 | 2.0 | 2 |

EXAMPLES 19 TO 20 AND COMPARATIVE EXAMPLES 15 TO 18

In each Example, using a sizing solution as identified in the following item (1), a coated paper was prepared by a method as identified in the following item (2). The tests for evaluating the physical properties of the coated paper were conducted in the same manner as in Example 1, and the results are shown in Table 5. Comparative Example 18, the non-coated paper (raw paper) was used. The IGT printability was measured in accordance with the following item (3).

(1) Sizing solution used
Example 19: same as in Example 1
Example 20: same as in Example 16
Comparative Example 15: same as Comparative Example 1
Comparative Example 16: same as Comparative Example 6
Comparative Example 17: same as Comparative Example 7

(2) Preparation of coated paper

A sizing solution was coated on one side of raw paper for newspapers having a width of 450 mm (basis weight: 48 g/m$^2$) by a gate roll coater for test at a coating speed of 100 m/min so that a dried coated amount would be 0.2 g/m$^2$, to obtain coated paper. This coated paper was adjusted at 20° C. for 24 hours under a relative humidity of 65% and used as a test specimen for evaluation.

(3) Test for evaluating IGT printability

Using a IGT printability tester, the IGT strength (cm/sec) was measured in accordance with TAPPI T-499 using ink IPI#8.

TABLE 5

| | Component A (PVA) | | | Physical properties of coated paper | | |
|---|---|---|---|---|---|---|
| | Average degree of polymerization | Degree of hydrolysis (mol %) | Type of compound as component B | Sticking strength of coated paper/coated paper (g/30 mm) | RI picking | IGT strength (cm/sec) |
| Example 19 | 1,700 | 99 | (X) | 2.5 | 0 | 56 |
| Example 20 | 1,700 | 99 | (Y) | 3.3 | 0 | 54 |
| Comparative Example 15 | 1,700 | 99 | — | 35.5 | 0 | 51 |
| Comparative Example 16 | 1,700 | 99 | Block | 4.5 | 0 | 54 |
| Comparative Example 17 | — | — | — | 25.5 | 2 | 36 |
| Comparative Example 18 | — | — | — | 1.3 | 3 | 24 |

Note 1)
The amount of component B is represented by parts by weight of component B per 100 parts by weight of component A (PVA).
Note 2)
"Block" in the column for "Type of compound" means a block copolymer wherein the backbone chain of component B comprises block segments of oxyethylene units and oxypropylene units.

What is claimed is:

1. A sizing agent for paper, which comprises 100 parts by weight of a polyvinyl alcohol (component A) and from 1 to 20 parts by weight of a compound (component B) provided with the following requisites (1) to (4):
   (1) the backbone chain is a random copolymer of ethylene oxide and propylene oxide,
   (2) in the backbone chain, the proportion of oxyethylene units is from 20 to 40% by weight, and the proportion of oxypropylene units is from 60 to 80% by weight,
   (3) of the two terminals, one terminal is a hydroxyl group, and the other terminal is a $C_{1-10}$ alkoxyl group or a hydroxyl group, and
   (4) the weight average molecular weight is from 600 to 1,200.

2. The sizing agent for paper according to claim 1, wherein of the two terminals of component B, one terminal is a hydroxyl group, and the other terminal is a $C_{1-10}$ alkoxyl group.

3. The sizing agent for paper according to claim 1, wherein the polyvinyl alcohol as component A is a homopolymer or copolymer of a fatty acid vinyl ester, which is completely or partially hydrolyzed.

4. The sizing agent for paper according to claim 1, wherein the polyvinyl alcohol as component A is a polymer of vinyl acetate, which is completely or partially hydrolyzed.

5. The sizing agent for paper according to claim 1, wherein the degree of hydrolysis of component A is at least 90 mol %.

6. The sizing agent for paper according to claim 1, wherein the degree of hydrolysis of component A is at least 97.5 mol %.

7. The sizing agent for paper according to claim 1, wherein the polyvinyl alcohol as component A has an average degree of polymerization of from 500 to 4,000.

8. The sizing agent for paper according to claim 1, wherein the polyvinyl alcohol as component A is water-soluble.

9. The sizing agent for paper according to claim 1, wherein component B is in an amount of from 2 to 10 parts by weight, per 100 parts by weight of component A.

10. A sizing agent for paper, which consists essentially of 100 parts by weight of a polyvinyl alcohol (component A) and from 1 to 20 parts by weight of a compound (component B) provided with the following requisites (1) to (4):
  (1) the backbone chain is a random copolymer of ethylene oxide and propylene oxide,
  (2) in the backbone chain, the proportion of oxyethylene units is from 20 to 40% by weight, and the proportion of oxypropylene units is from 60 to 80% by weight,
  (3) of the two terminals, one terminal is a hydroxyl group, and the other terminal is a $C_{1-10}$ alkoxyl group or a hydroxyl group and
  (4) the weight average molecular weight is from 600 to 1,200.

* * * * *